(12) United States Patent
Jiang et al.

(10) Patent No.: US 10,321,110 B2
(45) Date of Patent: Jun. 11, 2019

(54) METHOD AND APPARATUS FOR IMAGE PROCESSING

(71) Applicant: Nokia Technologies Oy, Espoo (FI)

(72) Inventors: Zhuo Jiang, Beijing (CN); Xiaopeng Lu, Beijing (CN); Wei Zong, Beijing (CN); Lingnan Li, Beijing (CN)

(73) Assignee: Nokia Technologies Oy, Espoo (FI)

( * ) Notice: Subject to any disclaimer, the term of this patent is extended or adjusted under 35 U.S.C. 154(b) by 140 days.

(21) Appl. No.: 15/313,224

(22) PCT Filed: May 29, 2014

(86) PCT No.: PCT/CN2014/078832
§ 371 (c)(1),
(2) Date: Nov. 22, 2016

(87) PCT Pub. No.: WO2015/180109
PCT Pub. Date: Dec. 3, 2015

(65) Prior Publication Data
US 2017/0195649 A1    Jul. 6, 2017

(51) Int. Cl.
*H04N 9/73* (2006.01)
*G06T 7/90* (2017.01)

(52) U.S. Cl.
CPC .............. *H04N 9/735* (2013.01); *G06T 7/90* (2017.01); *G06T 2207/10024* (2013.01); *G06T 2207/20021* (2013.01)

(58) Field of Classification Search
CPC ... H04N 9/64–9/76; H04N 1/56–1/628; G06T 2207/20021; G06T 7/90; G06K 9/4652
See application file for complete search history.

(56) References Cited

U.S. PATENT DOCUMENTS

| 6,069,972 A | 5/2000 | Durg et al. |
| 6,574,365 B1 | 6/2003 | Weldy |
| 7,606,414 B2 | 10/2009 | Boregowda et al. |
| 7,912,279 B2 | 3/2011 | Hsu et al. |
| 8,254,673 B2 | 8/2012 | Kwak et al. |

(Continued)

FOREIGN PATENT DOCUMENTS

| CN | 1612616 A | 5/2005 |
| CN | 101193317 B | 9/2010 |

(Continued)

OTHER PUBLICATIONS

International Search Report and Written Opinion received for corresponding Patent Cooperation Treaty Application No. PCT/CN2014/078832, dated May 29, 2014, 12 pages.

(Continued)

*Primary Examiner* — Paul M Berardesca
(74) *Attorney, Agent, or Firm* — Alston & Bird LLP

(57) ABSTRACT

A method, corresponding apparatuses, and a non-transitory computer readable medium for image processing are provided. A method comprises selecting at least one reference point on a sensor illumination response curve in a sensor illumination response plane. The method further comprises determining at least one dominant color evaluation region in the sensor illumination response plane based on the at least one reference point. With the claimed inventions, color reproduction performance could be improved.

12 Claims, 5 Drawing Sheets

(56) References Cited

U.S. PATENT DOCUMENTS

| | | |
|---|---|---|
| 2004/0212691 A1 | 10/2004 | Sato |
| 2005/0088537 A1 | 4/2005 | Nakamura et al. |
| 2005/0270383 A1 | 12/2005 | Hung |
| 2006/0176379 A1 | 8/2006 | Hyodo |
| 2007/0153304 A1 | 7/2007 | Ovsiannikov et al. |
| 2008/0101690 A1* | 5/2008 | Hsu .................. H04N 1/6027 382/162 |
| 2011/0050948 A1 | 3/2011 | Jeon et al. |
| 2013/0093917 A1 | 4/2013 | Zhang et al. |

FOREIGN PATENT DOCUMENTS

| | | |
|---|---|---|
| CN | 101370151 B | 12/2011 |
| CN | 102326392 A | 1/2012 |
| CN | 103139573 A | 6/2013 |
| CN | 103327345 A | 9/2013 |

OTHER PUBLICATIONS

Extended European Search Report received for corresponding European Patent Application No. 14893182.7, dated Jan. 10, 2018, 7 pages.

Chen et al., "Edge-Based Automatic White Balancing with Linear Illuminant Constraint", Proceedings Visual Communications and Image Processing, vol. 6508, Jan. 29, 2007, 12 Pages.

Nikkanen, "Color Constancy by Characterization of Illumination Chromaticity", Optical Engineering, vol. 50, No. 5, May 2011, 15 pages.

Office action received for corresponding Chinese Patent Application No. 201480079348.2, dated Dec. 4, 2017, 6 pages of office action and 3 pages of office action translation available.

Office Action for European Application No. 14 893 182.7 dated Jan. 24, 2019, 3 pages.

Office Action for Chinese Application No. 2014800793482 dated Mar. 4, 2019, 9 pages.

* cited by examiner

METHOD AND APPARATUS FOR IMAGE PROCESSING

RELATED APPLICATION

This application was originally filed as Patent Cooperation Treaty Application No. PCT/CN2014/078832 filed May 29, 2014.

FIELD OF THE INVENTION

Exemplary embodiments generally relate to image processing techniques. More particularly, exemplary embodiments relate to a method and apparatuses for image processing.

BACKGROUND

The following description of background art may include insights, discoveries, understandings or disclosures, or associations together with disclosures not known to the relevant art prior to the present disclosure but provided by the present disclosure. Some such contributions of the present disclosure may be specifically pointed out below, while other such contributions of the present disclosure will be apparent from their context.

Color reproduction performance is one of crucial characteristics of a camera, particularly a phone camera, which is incorporated into a mobile phone. The users would always desire the phone camera to capture the object's real color and provide a good color reproduction performance. For many common scenes where rich colors are shown in the images, auto white balance algorithms for the phone camera may obtain good results of the color reproduction. However, for a single color (non-grey) dominant scene, such as a large piece of grass, a blue sky, or single color backgrounds, which takes up a large area of the image, it would be quite challenging for the phone camera to obtain a color reproduction performance as expected.

The commonly used color reproduction algorithms mainly relate to an auto white balance algorithm and other color processing algorithms, such as 'gray world algorithm' and 'white point algorithm,' which may achieve good color reproduction performance for the scenes or images having rich colors. However, for single color dominant scenes or images without gray or white colors, there are high degrees of difficulties for the white balance algorithms to reproduce the color because no white or grey color could be found as reference points to estimate right illumination and therefore the captured images show chrominance aberration of some levels as compared with the original color.

This single dominant color reproduction problem is also described as 'gray world failure' problem in 'gray world' white balance algorithm. A technical paper, entitle "Color constancy by characterization of illumination chromaticity," proposes a method to address this problem by measuring the camera sensor characterization first and then using the estimated illuminance related sensor response Red ("R"), Green ("G"), Blue ("B") gains to reproduce color. Since the illumination for a single dominant color/gray world failure scene may be erroneously estimated, this method limits the R, G, B gains within Correlated Color Temperature ("CCT") A to B Kelvin ("K") to avoid too big gain being applied. In this manner, it may avoid too much chrominance aberration in the single color reproduction. However, it may be incapable of give accurate and tunable results for a single color.

Other solutions to the single dominant color reproduction problem may be based on sensor responses to certain colors in certain illuminations. Some pertinent steps may involve getting a certain single color response under certain illuminances and adjusting the white balance gain according to the color response characterization to achieve the desired color. The problem with this method is that if the single color covers no more than a half area of the image or the single color is not within the pre-calculated scope, the method becomes inefficient and errors would arise in the color reproduction.

SUMMARY

The following presents a simplified summary of the present disclosure in order to provide a basic understanding of some aspects of the present disclosure. It should be noted that this summary is not an extensive overview of the present disclosure and that it is not intended to identify key/critical elements of the present disclosure or to delineate the scope of the present disclosure. Its sole purpose is to present some concepts of the present disclosure in a simplified form as a prelude to the more detailed description that is presented later.

According to an aspect, there is provided a method. The method comprises selecting at least one reference point on a sensor illumination response curve in a sensor illumination response plane. The method also comprises determining at least one dominant color evaluation region in the sensor illumination response plane based on the at least one reference point.

In one embodiment, the sensor illumination response curve is formed based on red color, blue color and green color components of a testing image, and the selecting the at least one reference point comprises selecting, as the at least one reference point, a point where a sensor red color response per sensor green color response and a sensor blue color response per sensor green color response of the testing image to an illumination are the same on the sensor illumination response curve.

In another embodiment, the method further comprises evaluating whether an image contains the at least one dominant color by the at least one dominant color evaluation region.

In yet another embodiment, the evaluating whether the image contains the at least one dominant color comprises dividing the image into a plurality of grids, evaluating whether each grid of the plurality of grids is associated with the at least one dominant color evaluation region based on red color response per green color response, blue color response per green color response of each grid and determining that the image contains the at least one dominant color if the number of grids that are associated with the at least one dominant color evaluation region is equal to or greater than a threshold.

In a further embodiment, the method further comprises disabling a grey world balance algorithm for the grid that is associated with the at least one dominant color evaluation region.

In one embodiment, the method further comprises adjusting, subsequent to determining that the image contains the at least one dominant color, the at least one dominant color in a UV color domain by fine tune parameters.

In another embodiment, the method further comprises disabling a contrast enhancement to the image if the image has been determined as a single dominant color image.

According to an aspect, there is provided an apparatus. The apparatus comprises at least one processor and at least one memory including computer program instructions. The memory and the computer program instructions are configured to, with the at least one processor, cause the apparatus at least to select at least one reference point on a sensor illumination response curve in a sensor illumination response plane. The memory and the computer program instructions are also configured to, with the at least one processor, cause the apparatus at least to determine at least one dominant color evaluation region in the sensor illumination response plane based on the at least one reference point.

According to one aspect, there is provided an apparatus. The apparatus comprises means for selecting at least one reference point on a sensor illumination response curve in a sensor illumination response plane. The apparatus also comprises means for determining at least one dominant color evaluation region in the sensor illumination response plane based on the at least one reference point.

According to yet another aspect, there is provided a non-transitory computer readable medium having program code stored thereon, the program code configured to direct an apparatus, when executed, to select at least one reference point on a sensor illumination response curve in a sensor illumination response plane. The program code is also configured to direct the apparatus, when executed, to determine at least one dominant color evaluation region in the sensor illumination response plane based on the at least one reference point.

The aspects and embodiments as described above may be utilized separately or in combination and different combining forms may be constituted to target at least some intentions of the present disclosure as mentioned in the following.

By virtue of the aspects and embodiments as discussed above, sensors of the same type may have a relatively regular or fixed dominant color evaluation region for evaluating the single color image and therefore evaluation consistency between sensors of the same type could be achieved. Further, cameras including the phone camera, may achieve excellent red, green, blue, brown dominant color reproduction in a variety of sceneries. In addition, it is possible to achieve certain customized color reproduction performance by post-processing.

BRIEF DESCRIPTION OF THE DRAWINGS

The example embodiments that are presented in the sense of examples and their advantages are explained in greater detail below with reference to the accompanying drawings, in which.

DETAILED DESCRIPTION OF EMBODIMENTS

Various embodiments will now be described more fully hereinafter with reference to the accompanying drawings, in which certain embodiments of the present disclosure are shown. This disclosure may, however, be embodied in many different forms and should not be construed as limited to the embodiments set forth herein; rather, these embodiments are provided by way of example so that this disclosure will be thorough and complete, and will fully convey the scope of the present disclosure to those skilled in the art. Like numbers refer to like elements throughout the specification.

Generally, all terms used in the claims are to be interpreted according to their ordinary meaning in the technical field, unless explicitly defined otherwise herein. For example, a phone camera is one kind of camera that is incorporated or embed into a mobile or cellular phone for capturing images or scenes. Of course, the phone camera is only an example of the present disclosure for easy discussion and apparatuses and devices which may take advantage of the embodiments may be any type of terminal devices with embedded cameras, such as a mobile handset, a multimedia tablet, a laptop computer, a notebook computer, a netbook computer, a tablet computer, a personal communication device (PCS) device, which have embedded cameras for real time image capturing and processing.

All references to "a/an/the element, apparatus, component, means, or step" are to be interpreted openly as referring to at least one instance of the element, apparatus, component, means, or step unless explicitly stated otherwise. The steps of any method disclosed herein do not have to be performed in the exact order disclosed, unless explicitly stated. The discussion above and below in respect of any of the aspects of the present disclosure is also in applicable parts relevant to any other aspect of the present disclosure.

The following will discuss the details of the embodiments with reference to the accompanying drawings.

Figure 1:
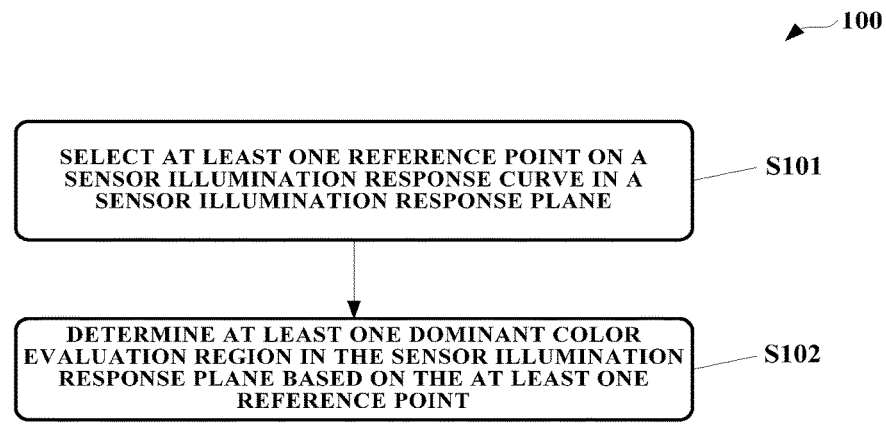
FIG. 1 is a flow chart schematically illustrating a method for image processing according to an embodiment.

FIG. 1 is a flow chart schematically illustrating a method 100 for image processing according to an embodiment. As illustrated in FIG. 1, at S101, the method 100 selects at least one reference point on a sensor illumination response curve in a sensor illumination response plane. The sensor illumination response curve and the sensor illumination response plane herein are exemplarily illustrated in FIG. 3, as will be discussed in detail later.

Figure 2:
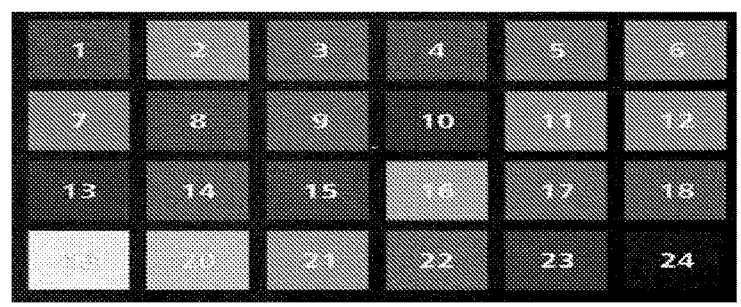
FIG. 2 is a Grey Macbeth chart image, which is used as an exemplary testing image according to an embodiment.
Figure 3:
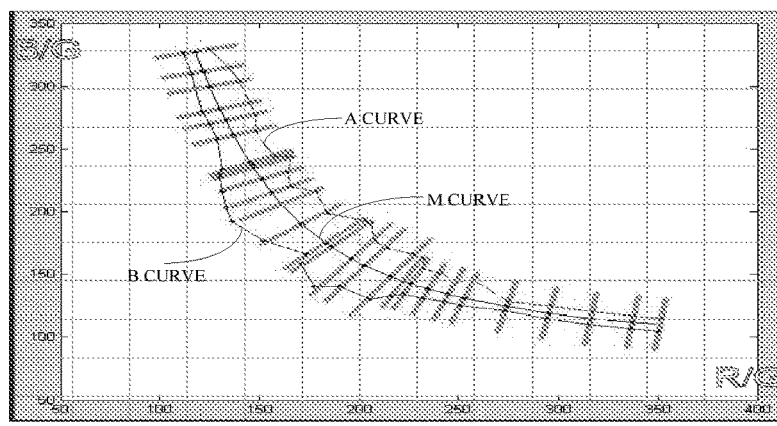
FIG. 3 is an exemplary diagram illustrating a sensor illumination response curve in a sensor illumination response plane according to an embodiment.

In an exemplary embodiment, the sensor illumination response curve is formed based on red color, blue color and green color components of a testing image, one example of which is illustrated in FIG. 2 and would be discussed later, and the selecting the at least one reference point at S101 may comprise selecting, as the at least one reference point, a point where a sensor red color response per sensor green color response and a sensor blue color response per sensor green color response of the testing image to an illumination are the same on the sensor illumination response curve. In other words, the reference point is the point whose values of the horizontal axis coordination and vertical axis coordination are equal on the sensor illumination response curve in the sensor illumination response plane, as shown in FIG. 3 as a non-limiting example.

At S102, the method 100 determines at least one dominant color evaluation region in the sensor illumination response plane based on the at least one reference point. According to the embodiment, the dominant color evaluation region may be used for properly evaluating whether an image to be processed are of at least dominant color and therefore subsequent processing could be proceeded for them so as to obtain a reproduced image with a better color quality.

Figure 4:
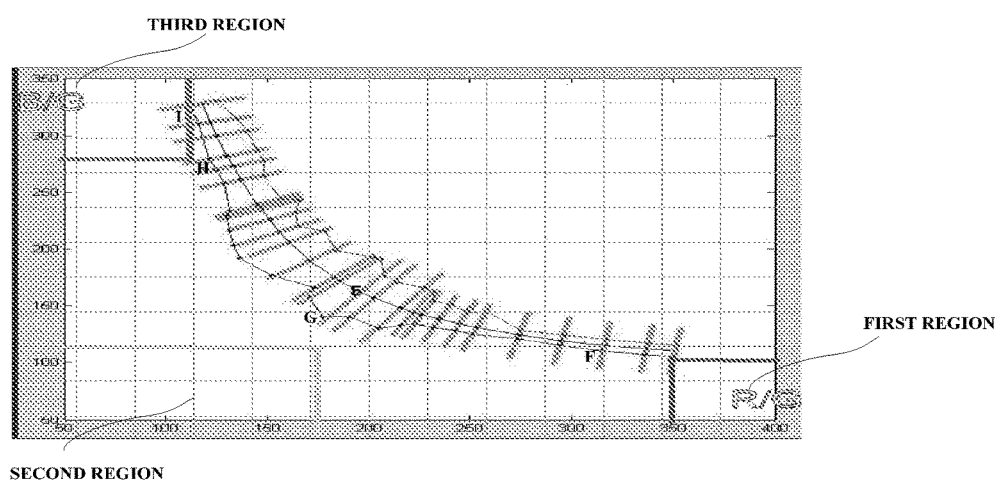
FIG. 4 is an exemplary diagram illustrating dominant color evaluation regions on the sensor illumination response plane as illustrated in FIG. 3 according to an embodiment.

In an exemplary embodiment, evaluating whether the image contains the at least one dominant color comprises dividing the image into a plurality of grids, evaluating whether each grid of the plurality of grids is associated with the at least one dominant color evaluation region based on the sensor red color response per sensor green color response and the sensor blue color response per sensor green color response of each grid and determining that the image contains the at least one dominant color if the number of grids that are associated with the at least one dominant color evaluation region is equal to or greater than a threshold, as will be discussed in detail with reference to FIG. 4.

In an exemplary embodiment, the method 100 may further comprise disabling a grey world balance algorithm for the grid that is associated with the at least one dominant color evaluation region. The disabling herein is due to the fact that grids with high color saturation cannot provide grey references and therefore result in a grey world algorithm failure.

In an exemplary embodiment, the method 100 may further comprise adjusting, subsequent to determining that the image contains the at least one dominant color, the at least one dominant color in a UV color domain by fine tune parameters, which would be discussed with reference to FIG. 6.

In an embodiment, the method 100 may further comprise disabling a contrast enhancement to the image if the image has been determined as a single dominant color image. As is known to those skilled in the art, in a general image processing flow, there should be contrast control for a better image contrast. However, with respect to a single dominant color image, such as a single color image, the corresponding histogram equalization will cause color error. Therefore, disabling the contrast enhancement would avoid the color error and be helpful in providing a vivid single color image.

With the method 100 and its variants as discussed above in the various embodiments, a reference point, which is specific to a type of sensor, could be relatively fixed and therefore, different sensors would have respective different reference points adapted thereto. Since the reference point is matched with or adapted to the sensor, the dominant color evaluation region determined by the reference point could also be retained the same for the same type of sensors and thus the same type of sensors may have the same evaluation criteria for determining whether the image is of a dominant color. In addition, post-processing, such as the UV color domain conversion and contrast enhancement disabling, could further improve the visual quality of the image containing at least one dominant color.

The following will discuss details of selecting the reference point and determining at least one dominant color evaluation regain in the sensor illumination response plane based on the reference point in connection with FIGS. 2-4.

FIG. 2 is a Grey Macbeth chart image 200, which is used as an exemplary testing image according to an embodiment. As illustrated in FIG. 2, the Grey Macbeth chart image 20 is divided into 24 grids, which are numbered from 1 to 24 and each of which contains a dominant color. In 28 International Commission on Illumination ("CIE") standard illuminations, the Grey Macbeth chart contains 18% mid-grey (grid or patch 22 as shown). With the 28 CIE standard illuminations and ±10% chromaticity changes applied thereto, the following sensor response to illuminations table 1 with respect to patch 22 would be obtained.

| CCT [K] | Center R/G | Center B/G | Bottom R/G | Bottom B/G | Above R/G | Above B/G |
|---|---|---|---|---|---|---|
| 1800 | 335 | 80 | 334 | 85 | 336 | 82 |
| 2167 | 331 | 84 | 330 | 81 | 332 | 86 |
| 2333 | 324 | 88 | 323 | 85 | 325 | 90 |
| 2500 | 317 | 92 | 315 | 89 | 319 | 95 |
| 2667 | 310 | 96 | 306 | 90 | 313 | 101 |
| 2833 | 303 | 101 | 296 | 91 | 309 | 110 |
| 3000 | 293 | 108 | 281 | 91 | 300 | 117 |
| 3167 | 277 | 120 | 258 | 97 | 286 | 131 |
| 3333 | 266 | 129 | 249 | 109 | 282 | 148 |
| 3500 | 256 | 138 | 241 | 123 | 275 | 158 |
| 3750 | 248 | 146 | 234 | 132 | 267 | 165 |
| 4000 | 238 | 156 | 224 | 143 | 255 | 173 |
| 4250 | 228 | 167 | 214 | 155 | 243 | 180 |
| 4500 | 219 | 178 | 204 | 165 | 235 | 191 |
| 5000 | 206 | 195 | 184 | 179 | 221 | 206 |
| 5500 | 195 | 211 | 168 | 194 | 210 | 220 |
| 6000 | 190 | 220 | 161 | 203 | 205 | 229 |
| 6500 | 185 | 228 | 155 | 211 | 201 | 237 |
| 7000 | 177 | 244 | 153 | 232 | 196 | 253 |
| 7500 | 173 | 252 | 156 | 244 | 193 | 261 |
| 8000 | 170 | 259 | 156 | 253 | 191 | 268 |
| 9000 | 160 | 285 | 148 | 280 | 175 | 290 |
| 10000 | 156 | 297 | 145 | 294 | 172 | 302 |
| 11500 | 154 | 303 | 143 | 300 | 172 | 308 |
| 13500 | 149 | 321 | 139 | 319 | 169 | 326 |
| 17500 | 144 | 342 | 134 | 340 | 164 | 347 |
| 25000 | 135 | 390 | 128 | 389 | 150 | 392 |
| 28000 | 124 | 398 | 121 | 398 | 141 | 401 |

In the table 1 above, CCT spans from 1800K to 28000K, "Center R/G" refers to ratios of averages of red color components to averages of the green color components in the patch 22 under 28 CIE standard illuminations and similarly, "Center B/G" refers to ratios of averages of blue color components to averages of the green color components in the patch 22 under 28 CIE standard illuminations. Likewise, "Above R/G" or "Above B/G" refers to the ratios of averages of the red or blue color components to the green color components in the patch 22 under 28 CIE standard illuminations with +10% chromaticity changes and similarly, "Bottom R/G" or "Bottom B/G" refers to ratios of averages of the red and blue color components to the green color components in the patch 22 under 28 CIE standard illuminations with −10% chromaticity changes.

Based on the items in the table 1, three sensor illumination response curves could be exemplarily depicted in a sensor illumination response plane with respect to the patch 22 under different illuminations, i.e., an "A" curve resulting from 28 CIE standard illuminations with +10% chromaticity change, an "M" curve resulting from 28 CIE standard illuminations, and a "B" curve resulting from 28 CIE standard illuminations with −10% chromaticity changes, with each point representing one illumination. As seen from FIG. 3, the sensor illumination response plane has a horizontal axis, which denotes R/G, and a vertical axis, which denotes B/G, where the R/G and B/G have the same meaning as those in table 1. That is, "R/G" in the curves may refer to the sensor red color response per sensor green color response and "B/G" in the curves may refer to the sensor blue color response per sensor green color response.

To determine which areas on the sensor illumination response plane could be used to evaluate whether a captured image contains a dominant color, exemplary embodiments of the present disclosure introduce a reference point which would be used as a benchmark for selecting curtain areas for dominant color evaluation. Preferably, an equal energy point at which a sensor red color response and a sensor blue color response of a testing image (e.g., patch 22 of the Grey Macbeth chart image) to an illumination are the same on the sensor illumination response curve may be selected as the reference point. The selection of the equal energy point may be impacted by an Infrared Radiation ("IR") filter. For example, if the IR filter cuts off too much red and green light, then equal energy point of the red and blue colors would be higher than the white point D65 (6500 k). In contrast, if the IR filter remains more IR band light, then the equal energy point of the red and blue colors would be lower than the white point D65. As can be seem from the table 1, the equal energy point is between 5000 k and 5500 k. After rounding operations, it may be determined that the equal energy point is at 5000 k, which is indicated by the point "E" in FIG. 4, and there are 3 steps between 5000 k to 6500 k, 500 k per step.

Let D denote 3, which is the number of steps above, the at least one dominant color evaluation region, such as the red dominant color evaluation region, the green dominant color evaluation region, or the blue dominant color evaluation region could be determined as follows:

Red dominant color evaluation region: a region whose vertical axis coordinates are less than 2167 k B/G and horizontal axis coordinates are greater than 2167 k R/G, resulting in a first region as illustrated in a lower right corner of the sensor illumination response plane under the "B" curve;

Green dominant color evaluation region: a region whose vertical axis coordinates are less than the B/G value of a $D^{th}$ point in the "B" curve, i.e., the third point from the bottom of the "B" curve in this example as illustrated as "F," and whose horizontal axis coordinates are less than the R/G values of a point "G" in the "B" curve, which corresponds to the equal energy point "E" in the "M" curve; and Blue dominant color evaluation region: a region whose vertical axis coordinates are greater than the B/G value of a $(28-D)^{th}$ point in the "B" curve, i.e., the $25^{th}$ point from the bottom of the "B" curve in this example as illustrated as "H," and whose horizontal axis coordinates are less than the R/G values of a $28^{th}$ point in the "B" curve, as denoted by "I" in the "B" curve.

Based on the above exemplary approach, different dominant color evaluation regions may be manifested from the sensor illumination response plane and ready for determining whether the captured image is in one or more dominant color.

It should be noted that the above selection of the reference point and determination of the different dominant color evaluation regions are illustrative and not limiting in any way. A person skilled in the art, based on the teaching presented herein, would envisage any other suitable manners or approaches to select the reference point and thereby determine the corresponding dominant color evaluation regions. For example, the reference point could be any other suitable point in one of the "A," "M," and "B" curves and once this reference point is selected, at least one dominant color evaluation region could be circled on the sensor illumination response plane. Further, it is to be understood that although the red, green and blue dominant colors are discussed above, the embodiments of the present disclosure should not be limited thereto. A person skilled in the art, based on the teaching presented herein, would envisage that other dominant color evaluation regions, such as brown dominant color evaluation region, could be obtained and depicted on the sensor illumination response plane.

Figure 5:
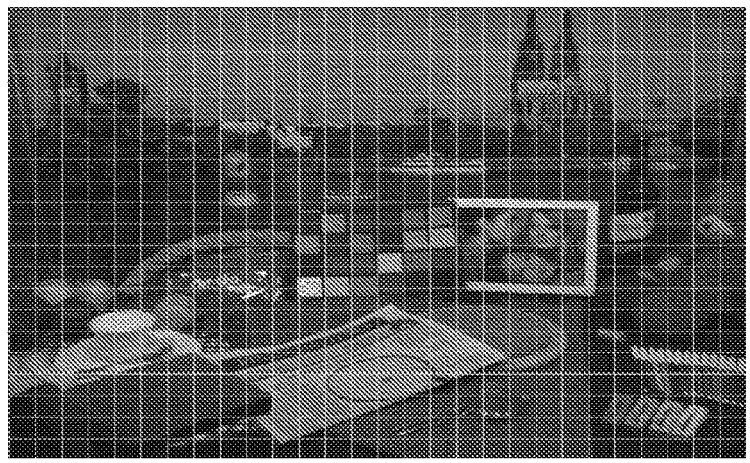
FIG. 5 is an exemplary diagram illustrating an image being divided into a plurality of grids according to an embodiment.

The following would discuss, with reference to FIG. 5, determination of one or more dominant colors in the captured image 500 using the multiple dominant color evaluation regions as illustrated in FIG. 4.

At the beginning, the Bayer image 500 as shown in FIG. 5, may be split or divided into 28×21 grids. Then, average R, G, B component values, and B/G, R/G values of each grid may be calculated. For example, for a 2 Mega pixel Bayer pattern camera, the resolution is 1600×1200 and pixel number G:R:B=2:1:1. After spilt into 28×21 grids, one grid contains 57×57=3249 pixels and then there are 1625 G pixels, 812 B pixels and 812 R pixels. Average of the G components may be obtained by summing all G pixel values and then divided by 1625. In a similar manner, the averages of R and B components could also be obtained. Then, ratio values of B/G and R/G could likewise be computed.

Then, for each grid, whether a point whose vertical axis and horizontal axis coordinates determined by the B/G and R/G values of each grid falls within the red, green, or blue dominant color evaluation regions is determined and counted. To this end, three counters, as denoted as Count_Red, Count_Green, and Count_Blue, could be established for respective regions to count the respective number of points therein. For instance, the total number of grids, TotalBlockNumber, is equal to 28×21=588. If the counter of a certain region reaches an amount equal to or greater than half of the TotalBlockNumber, which acts as a pre-determined threshold, then the image may be identified as being in a certain dominant color. In this case, if Count_Red×100/TotalBlockNumber>50, then the image may be identified as a red dominant scene; if Count_Green×100/TotalBlockNumber>50, then the image may be identified as a green dominant scene; if Count_Blue×100/TotalBlockNumbe50, then the image may be identified as a blue dominant scene. For example, if the Count_Green is greater than 50 for the image 500, then it may be determined that the image 500 is a green dominant scene and therefore some special or enhancement operations could be carried out for achieving a better visual presentation. The following would discuss some special or enhancement processing after the image is determined as containing at least one dominant color or as a single dominant color image.

In an exemplary embodiment, the grey world white balance algorithm could be modified based on R, G, B counters above. For example, if the B/G and R/G values of the grids fall into one of the dominant color evaluation regions, these grids then should be refrained from using by the grey world algorithm since these grids being of high color saturation may lead to a grey world failure. In other words, a grey world balance algorithm may be disabled for the grid that is associated with the at least one dominant color evaluation region.

In another exemplary embodiment, if the number of grids for which the corresponding B/G and R/G values fall within a certain evaluation region is greater than 90% of the total number of grids, then it may be adjudged that there is nearly only one color in this image, i.e., a single. Therefore, it is unnecessary to perform the white balance algorithm and calculate the CCT because it may be easy to get wrong results. In this case, the Automatic White Balance ("AWB") results and CCT calculated previously could be retained and applied.

Figure 6:
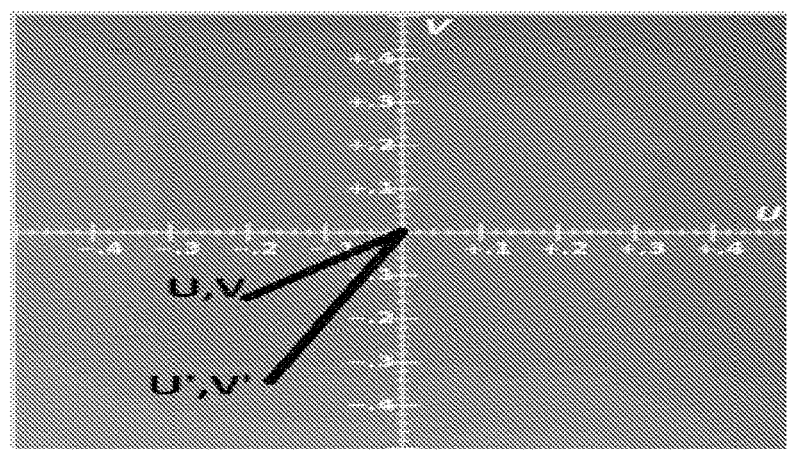
FIG. 6 is an exemplary diagram illustrating a fine color correction to the evaluated single dominant color in a UV color domain.

In an exemplary embodiment, the steps as discussed with reference to FIGS. 1-5 and performed in the raw Bayer domain, which is not a final color domain, could be subject to color delta or color correction in the final UV color domain, as illustrated in FIG. 6. For example, once the image is determined as containing a dominant color, the dominant color could be accurately controlled by fine tune parameters stored in an external memory. This may be done by the following equation.

$$\begin{pmatrix} U' \\ V' \end{pmatrix} = \begin{pmatrix} a & b \\ c & d \end{pmatrix} \begin{pmatrix} U \\ V \end{pmatrix},$$

wherein U and V are associated with the original colors, and U' and V' are associated with the final colors, and the fine tune parameters a, b, c and d could be give any suitable values as needed by customers. For example, if a, b, c, d=(1, 0, 0, 1), then U'=U and V'=V, meaning no color correction. If the saturation of the original color being changed by two times is desired, then let a, b, c, d=(2, 0, 0, 2). If changes to the Hue are desired, meaning angel changes in the UV color domain, then let a, b, c, d=(2, 0.25, 0.15, 2). The values of a, b, c, and d could be listed as options for user selection. In a nutshell, subsequent to determining that the image contains the at least one dominant color, the at least one dominant color in a UV color domain may be adjusted by fine tune parameters according to the exemplary embodiment of the present invention.

In an exemplary embodiment, contrast enhancements may be disabled for the image if it has been classified as a single color dominant scene, so as to avoid color error. This may be due to the fact that histogram equalization in the contrast enhancement will cause color error for the single color dominant scene and therefore disablement of the contrast enhancements would avoid the color error or color shift.

Figure 7:
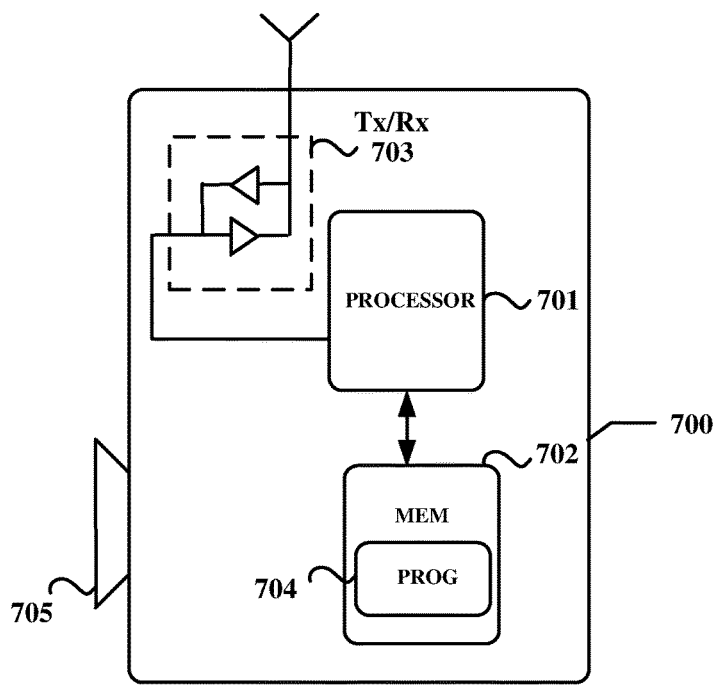
FIG. 7 is a simplified schematic block diagram illustrating a representative apparatus according to an embodiment.

FIG. 7 is a simplified schematic block diagram illustrating a representative apparatus 700 according to an embodiment. As illustrated in FIG. 7, the apparatus 700 includes at least one processor 701, such as a data processor, at least one memory (MEM) 702 coupled to the processor 701, a suitable RF transmitter TX and receiver RX 703 coupled to the processor 701, and an embedded camera 705. The MEM 702 stores a program (PROG) 704. The TX/RX 703 is for bidirectional wireless communications.

The PROG 704 is assumed to include instructions that, when executed by the processor 701, enable the apparatus 700 to operate in accordance with the exemplary embodiments, as discussed herein with the method 100. For example, the apparatus 700 may be embodied as a terminal device or a part thereof to carry out the method 100 and subsequent processing.

In general, embodiments of the present disclosure may be implemented by computer software executable by at least one processor 701 of the apparatus 700, or by hardware, or by a combination of software and hardware.

The MEM 702 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the apparatus 700, there may be several physically distinct memory units in the apparatus 700. The processor 701 may be of any type suitable to the local technical environment, and may include one or more of general purpose computers, special purpose computers, microprocessors, digital signal processors (DSPs) and processors based on multicore processor architecture, as non limiting examples. The apparatus 700 may have multiple processors, such as for example an application specific integrated circuit chip that is slaved in time to a clock which synchronizes the main processor.

According to some example embodiments, the at least one memory and computer program instructions are configured to, with the at least one processor, cause the apparatus 700 further to select at least one reference point on a sensor illumination response curve in a sensor illumination response plane. In another example embodiment, the at least one memory and computer program instructions are configured to, with the at least one processor, cause the apparatus 700 further to determine at least one dominant color evaluation region in the sensor illumination response plane based on the at least one reference point.

In an exemplary embodiment, the at least one memory and computer program instructions are configured to, with the at least one processor, cause the apparatus 700 further to disable a grey world balance algorithm for the grid that is associated with the at least one dominant color evaluation region.

In another exemplary embodiment, the at least one memory and computer program instructions are configured to, with the at least one processor, cause the apparatus 700 further to adjust, subsequent to determining that the image contains the at least one dominant color, the at least one dominant color in a UV color domain by fine tune parameters.

In yet another exemplary embodiment, the at least one memory and computer program instructions are configured to, with the at least one processor, cause the apparatus 700 further to disable a contrast enhancement to the image if the image has been determined as a single dominant color image.

It is to be understood that the apparatus 700 is able to carry out the method 100 and subsequent processing as discussed with respect to FIGS. 2-6 according to the embodiments and may be embodied as a terminal device or apart thereof.

Figure 8:
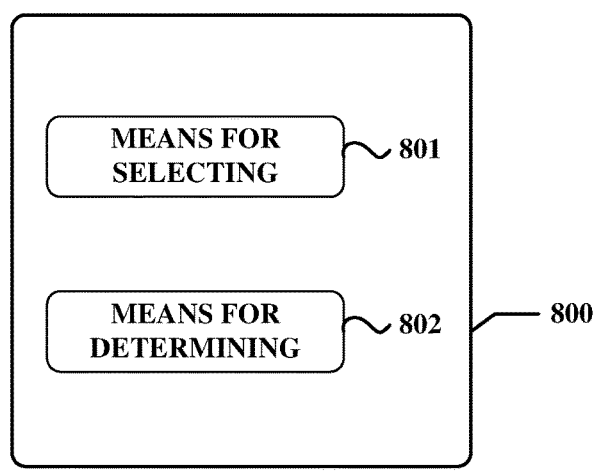
FIG. 8 is a simplified schematic block diagram illustrating another representative apparatus according to an embodiment.

FIG. 8 is a simplified schematic block diagram illustrating another representative apparatus 800 according to an embodiment. As illustrated in FIG. 8, the apparatus 800 comprises means for selecting 801, at least one reference point on a sensor illumination response curve in a sensor illumination response plane. The apparatus 800 further comprises means for determining 802 at least one dominant color evaluation region in the sensor illumination response plane based on the at least one reference point.

In an exemplary embodiment, the sensor illumination response curve is formed based on red color, blue color and green color components of a testing image, and the means for selecting 801 the at least one reference point comprises means for selecting, as the at least one reference point, a point where a sensor red color response per sensor green color response and a sensor blue color response per sensor green color response of the testing image to an illumination are the same on the sensor illumination response curve.

In another exemplary embodiment, the apparatus 800 further comprises means for evaluating whether an image contains the at least one dominant color by the at least one dominant color evaluation region.

In yet another exemplary embodiment, the means for evaluating whether the image contains the at least one dominant color comprises means for dividing the image into a plurality of grids, means for evaluating whether each grid of the plurality of grids is associated with the at least one dominant color evaluation region based on the sensor red color response per sensor green color response and the sensor blue color response per sensor green color response of each grid and means for determining that the image contains the at least one dominant color if the number of grids that are associated with the at least one dominant color evaluation region is equal to or greater than a threshold.

In an additional exemplary embodiment, the apparatus 800 comprises means for disabling a grey world balance algorithm for the grid that is associated with the at least one dominant color evaluation region.

In a further exemplary embodiment, the apparatus 800 further comprises means for adjusting, subsequent to determining that the image contains the at least one dominant color, the at least one dominant color in a UV color domain by fine tune parameters.

In an exemplary embodiment, the apparatus 800 further comprises means for disabling a contrast enhancement to the image if the image has been determined as a single dominant color image.

It is to be understood that the apparatus 800 is able to carry out the method 100 and subsequent processing as discussed with respect to FIGS. 2-6 according to the embodiments and may be embodied as another form of a terminal device or a part thereof.

Figure 9:
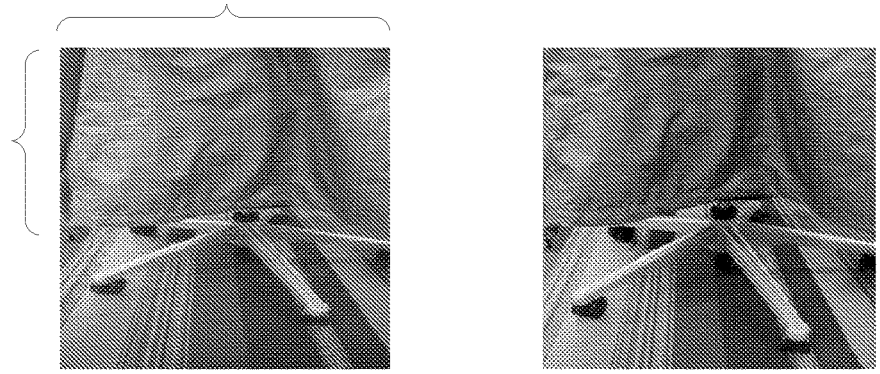
FIGS. 9-11 are diagrams illustrating original images, which respectively have the red, green, and blue dominant color, versus processed images through the methods and apparatuses of various embodiments.
Figure 10:
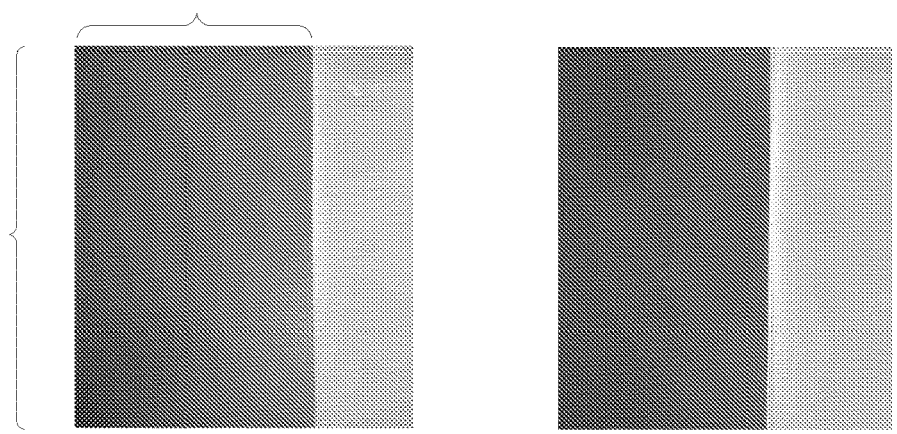
Figure 11:
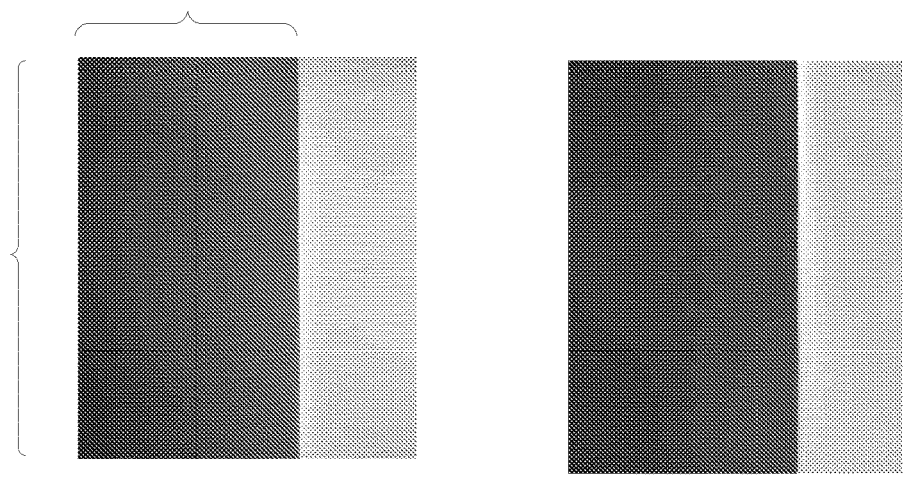

FIGS. 9-11 are diagrams illustrating original images, which respectively have the red, green, and blue dominant color, versus processed images through the method 100 and apparatuses 700 or 800 of the present disclosure. It can be seen from FIGS. 9-11 that the dominant colors as identified and pre-processed seem much brighter and more vivid compared to the original colors as indicated by the braces.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (for example, procedures, functions, and so on) that perform the functions described herein. The software codes may be stored in any suitable, processor/computer-readable data storage medium (s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

Many modifications and other embodiments set forth herein will come to mind to one skilled in the art to which these embodiments of the disclosure pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method, comprising:
    selecting at least one reference point on a sensor illumination response curve in a sensor illumination response plane;
    determining at least one dominant color evaluation region in the sensor illumination response plane based on the at least one reference point;
    dividing an image into a plurality of grids;
    evaluating whether at least some of the grids of the plurality of grids are associated with the at least one dominant color evaluation region based on a sensor red color response per sensor green color response, and a sensor blue color response per sensor green color response of each grid;
    determining that the image comprises the at least one dominant color if a number of grids that are associated with the at least one dominant color evaluation region satisfies a threshold; and
    adjusting, subsequent to determining that the image contains the at least one dominant color, the at least one dominant color in a UV color domain by fine tune parameters.

2. The method according to claim 1, wherein the sensor illumination response curve is formed based on red color, blue color and green color components of a testing image, and the selecting the at least one reference point comprises selecting, as the at least one reference point, a point where a sensor red color response per sensor green color response and a sensor blue color response per sensor green color response of the testing image to an illumination are the same on the sensor illumination response curve.

3. The method according to claim 1, further comprising disabling a grey world balance algorithm for a grid that is associated with the at least one dominant color evaluation region.

4. The method according to claim 1, further comprising disabling a contrast enhancement to the image if the image has been determined as a single dominant color image.

5. An apparatus, comprising:
    at least one processor; and
    at least one memory comprising computer program instructions,
    wherein the at least one memory and the computer program instructions are configured to, with the at least one processor, cause the apparatus at least to:
    select at least one reference point on a sensor illumination response curve in a sensor illumination response plane;
    determine at least one dominant color evaluation region in the sensor illumination response plane based on the at least one reference point;
    divide an image into a plurality of grids;
    evaluate whether at least some of the grids of the plurality of grids are associated with the at least one dominant color evaluation region based on a sensor red color response per sensor green color response, and a sensor blue color response per sensor green color response of each grid;
    determine that the image comprises the at least one dominant color if a number of grids that are associated with the at least one dominant color evaluation region satisfies a threshold; and adjust, subsequent to determining that the image contains the at least one dominant color, the at least one dominant color in a UV color domain by fine tune parameters.

6. The apparatus according to claim 5, wherein the sensor illumination response curve is formed based on red color, blue color and green color components of a testing image, and the at least one memory and computer program instructions are configured to, with the at least one processor, cause the apparatus further to:

select, as the at least one reference point, a point where a sensor red color response per sensor green color response and a sensor blue color response per sensor green color response of the testing image to an illumination are the same on the sensor illumination response curve.

7. The apparatus according to claim 5, wherein the at least one memory and computer program instructions are configured to, with the at least one processor, cause the apparatus further to:

disable a grey world balance algorithm for a grid that is associated with the at least one dominant color evaluation region.

8. The apparatus according to claim 5, wherein the at least one memory and computer program instructions are configured to, with the at least one processor, cause the apparatus further to:

disable a contrast enhancement to the image if the image has been determined as a single dominant color image.

9. A non-transitory computer readable medium having program code stored thereon, the program code configured to direct an apparatus, when executed, to:

select at least one reference point on a sensor illumination response curve in a sensor illumination response plane;

determine at least one dominant color evaluation region in the sensor illumination response plane based on the at least one reference point;

divide an image into a plurality of grids;

evaluate whether at least some of the grids of the plurality of grids are associated with the at least one dominant color evaluation region based on a sensor red color response per sensor green color response, and a sensor blue color response per sensor green color response of each grid;

determine that the image comprises the at least one dominant color if a number of grids that are associated with the at least one dominant color evaluation region satisfies a threshold; and adjust, subsequent to determining that the image contains the at least one dominant color, the at least one dominant color in a UV color domain by fine tune parameters.

10. The non-transitory computer readable medium according to claim 9, wherein the sensor illumination response curve is formed based on red color, blue color and green color components of a testing image, and the program code is configured to further direct the apparatus, when executed, to:

select, as the at least one reference point, a point where a sensor red color response per sensor green color response and a sensor blue color response per sensor green color response of the testing image to an illumination are the same on the sensor illumination response curve.

11. The non-transitory computer readable medium according to claim 9, wherein the program code is configured to further direct the apparatus, when executed, to disable a grey world balance algorithm for a grid that is associated with the at least one dominant color evaluation region.

12. The non-transitory computer readable medium according to claim 9, wherein the program code is configured to further direct the apparatus, when executed, to disable a contrast enhancement to the image if the image has been determined as a single dominant color image.

* * * * *